United States Patent Office 3,679,635
Patented July 25, 1972

---

3,679,635
OPERATION OF POLYAMIDE CONTINUOUS POLYMERIZATION SYSTEM
Bruce W. Portus, Greenville, S.C., assignor to Fiber Industries, Inc.
No Drawing. Filed July 8, 1970, Ser. No. 53,270
Int. Cl. C08g 20/20
U.S. Cl. 260—78 R    7 Claims

---

ABSTRACT OF THE DISCLOSURE

Polyamide continuous polymerization system is operated by maintaining inert, substantially oxygen-free blankets through the system during start-up and shut-down periods.

---

BACKGROUND OF THE INVENTION

The present invention relates to the continuous polymerization of polymers, particularly the polycondensation polymerization of polyamides.

More particularly, the present invention relates to a process for operating a polyamide continuous condensation polymerization system of the two-phase, annular flow type wherein an aqueous dispersion, more particularly an aqueous solution, of polyamide-forming material is fed under pressure into the inlet of an elongated tubular reaction zone wherein the feed material is polymerized to high molecular weight polyamide suitable for shaped article formation while continuously flowing therethrough to an outlet which is under a lower pressure than the inlet thereof.

Even more particularly, the present invention is directed to the operation of a continuous polyamide polymerization system including specific steps during the start-up and shut-down thereof which markedly reduce operating costs and time by virtually eliminating the build-up of undesired by-products, particularly degraded polymer gel, during start-up and shut-down sequences. Additionally, the use of the present invention enables the production of a more uniform and pure product while lowering wasteage by reducing degraded polymer build-up in the reaction zone. Degraded polymer, when formed during the reactor start-up and shut-down sequences, remains occluded to the interior walls of the reactor and can contaminate substantial quantities of freshly-formed polymer, which polymer heretofore would have to be discarded or sold at a reduced price as second quality material for end uses which do not require high purity.

High molecular weight linear fiber-formable polyamides, such as polycaprolactam, or nylon 6, and polyhexamethylene adipamide, or nylon 66, have been prepared conventionally in batch operations involving the condensation polymerization of the requisite reactant, for example, epsilon caprolactam or hexamethylene diamine-adipic acid salt. Recently, a process of commercial importance has been developed by which high molecular weight linear condensation polyamides of a degree of polymerization and purity for article shaping, particularly melt spinning into filaments, are produced by the continuous polymerization of the polymer precursor. The present invention is especially directed to continuous polymerization systems which involve two-phase annular flow through a narrow elongated tubular reactor as described more fully in the detailed description hereinbelow.

The continuous polymerization system, as compared with the batch process for polymerizing polyamide, offers technical advantages of importance because of the uniform high quality of the polymer which is produced, since the polymer is not subject to batch-to-batch variation.

The general type of continuous polymerization system to which the present invention is directed is described in U.S. Pat. 3,193,535 by Carter, the specification of which is incorporated herein by reference.

In the continuous polymerization condensation system for producing high molecular weight linear polyamides of desired degree of polymerization and purity for fiber-forming operations as described in the above-mentioned patent, an aqueous feed, more particularly an aqueous solution, of polymer-producing reactant (sometimes referred to as monomer salt) is fed under pressure to the inlet of an elongated reaction zone, said zone being in the form of a long narrow coiled tube, the tube being heated to polymerization temperatures so that the material polymerizes as it passes through the tube and wherein the pressure continuously decreases along the tube from inlet to outlet thereof. In certain embodiments, pressure falls to substantially atmospheric or subatmospheric at the exit end of the tube. The temperature within the tube is regulated to assure the vaporization of steam derived from the water present in the initial feed material and also derived from the condensation reaction, along the entire length of the tube.

It has been found, as with any continuous polymerization system, that the situation arises where the reactor must be shut down for a length of time and subsequently started-up again. For example, quantity requirements change over a period of time during plant operation causing it to be uneconomical to maintain full capacity when subsequent polymer utilization, such as by a melt-spinning operation, can not absorb the entire output from the polymerizers. Also, at times it could be desirable to change over from the polymerization of one particular polyamide, such as nylon 6, to the polymerization of another polyamide, such as nylon 66, as the requirements of the market place fluctuate. Further, at intervals filter packs must be replaced, additives changed and the like, which also necessitate shut-down.

Unless the continuous polymerization system is operated within certain principles outlined herein, particularly during start-up and shut-down procedures, undesirable by-products, particularly polymer decomposition gels, form along the inner surface of the reaction zone, particularly near the outlet end thereof, during start-up and shut-down sequences. The polymer decomposition product, which appears to be in a somewhat gel-like structure, is primarily composed of degraded polymer formed chiefly by an oxidative degradation reaction caused by the exposure of polymer residue remaining in the reaction zone to temperature above about 150° C. during the shut-down and start-up operations.

Therefore, it is an object of the present invention to provide a process for operating a polyamide continuous condensation polymerization system of the two-phase annular flow type.

A further object of the present invention is to provide an integrated process for polymerizing an aqueous system of polyamide-formable reactant in an elongated reaction zone in two-phase annular flow, including process sequences to start-up and shut-down said system without causing undesired by-product formation, particularly oxidatively degraded polymer, along the inner walls of the reaction zone.

An additional object of the invention is to provide a process for operating a polyamide continuous condensation polymerization system of the two-phase annular flow type, particularly the start-up and shut-down operating sequences thereof, in a rapid efficient manner which minimizes reactor shut-down time and reduces the need to further clean the reactor by acid scouring and the like procedures which tend to damage the elongated coil, thus leading to overall advantages and the production of a product of uniform high purity suitable for melt-spinning fiber-forming operations.

Other objects of the invention will be obvious to those skilled in the art from the detailed description of the invention hereinafter.

SUMMARY OF THE INVENTION

In accordance with the invention, it has now been found that polyamide condensation polymerization systems wherein an aqueous feed, more particularly an aqueous solution, of polyamide-forming reactants is fed into the inlet end of an elongated tubular reaction zone maintained under polymerization conditions of heat and pressure and wherein said monomer is polymerized while flowing therethrough in two-phase annular flow while associated with evolved steam, can be advantageously operated by a process which comprises starting up said system by maintaining an inert, substantially oxygen-free blanket, and more particularly a water or steam blanket, in said reaction zone during the period in which said zone is heated from ambient to polycondensation polymerization reaction temperature; conducting said continuous condensation polymerization and shutting down said system by continuously flowing an inert, substantially oxygen-free cooling medium, more particularly water, therethrough until said reactor is cooled to a temperature below about 50° C.

In a preferred embodiment of the invention, the start-up sequence for the polymerization system comprises the sequential steps of feeding water to the inlet of the elongated tubular reaction zone prior to commencing to heat said zone; heating said zone as rapidly as possible from about ambient temperature to the desired temperature of polyamide polycondensation polymerization while maintaining a blanket of water or steam throughout said reaction zone and subsequently feeding an aqueous solution of reactant under pressure to said inlet when said temperature is reached.

In another preferred embodiment of the invention, the polymerization system is shut-down following the termination of the polyamide polycondensation polymerization reaction by the sequential process of first feeding into the tubular reactor a monomer/chain stopper mixture to form low molecular weight polyamide which flushes out the high molecular weight polymer, which high molecular weight polymer is more subject to oxidative degradation in the reaction zone, until substantially all high molecular weight polymer has been removed from the reaction zone, said mixture being forced through the elongated tubular reaction zone at a pressure corresponding to about the normal operating pressure in the reactor; then forcing a chain stopper/water mixture through the reaction zone to remove therefrom substantially all of the low molecular weight polymer produced during the initial, flushing operation and finally feeding water through said reactor until the temperature of the reactor drops to below about 50° C.

DETAILED DESCRIPTION OF THE INVENTION

The present invention relates to the operation of a continuous polymerization system, particularly suitable for the polycondensation polymerization of polyamides of requisite degree of polymerization for article shaping, i.e. fiber-forming operations, wherein an aqueous mixture of polyamide-forming reactants (preferably an aqueous solution) is pumped under pressure into the inlet of an elongated, tubular reaction zone. Reference is made to the above-identified Carter patent for further operating details of such a system in connection with the polymerization of polyamides in addition to the description herein.

In the operaton of the tubular polymerizer, a pressure which decreases from inlet to outlet is established through the reaction zone by the superatmospheric pressure produced at the inlet side. The pressure continuously decreases along the tubular reaction zone (generally in the form of a coiled pipe) from an inlet pressure of usually at least about 14 atmospheres to substantially atmospheric or subatmospheric pressure at the exit thereof. The reactor empties the produced polymer into a polymer reservoir wherein the polymer is temporarily retained to separate steam from polymer and/or is further polymerized to obtain the desired relative viscosity polymer prior to, for example, melt spinning or extrusion into polymer chip. The polymer reservoir, or melt pool, is usually maintained at substantially atmospheric or subatmospheric (reduced) pressure. Reduced pressure is particularly useful where high relative viscosities are desired. Thus, the present invention enables the operation of a continuous polyamide polymerization system wherein polyamide monomer, along with desired additives, is continuously polymerized and shaped into a final product of reproducible, high purity, strength and the like characteristics.

Referring more specifically to the elongated, tubular reaction zone, the aqueous reactant solution is fed into the entrance thereof at a pressure of at least about 210 p.s.i.g., preferably about 300 to 450 p.s.i.g., while the exit is maintained under substantially atmospheric or reduced pressure in order to establish the decreasing pressure gradient through the reactor. The pressure through the reaction zone decreases continuously in the sense that there is no sudden or abrupt drop in pressure but a continuous, substantially uniform decrease in pressure throughout the entire length of the tubular reactor from entrance to exit thereof.

Temperature in the reactor tube is regulated by the employment of heating means in order that polymerization occurs throughout the tube under existing pressure conditions to produce polymer of requisite relative viscosity and/or degree of polymerization at the exit end of the tube or thereafter as desired. Thus, a temperature gradient could be employed along the reactor tube but in practice the entire reactor is heated to the temperature required at the exit end of the tube for polycondensation at substantially atmospheric or reduced pressures. The entire reactor is surrounded by heating means to maintain a reactor temperature at least 10° C. above the melting point of the polyamide. For example, it is known that polyhexamethylene adipamide polymers are advantageously formed from the corresponding salt at about 280° C.–290° C. with minimal degradation. Therefore, the above stated temperature range would be recommended for the polymerization of nylon 66 in accordance with the present invention.

Because of the decreasing pressure gradient effected by the design of the reactor, steam volatilizes from the aqueous feed solution and rushes at high linear speeds toward the exit end of the reactor, i.e. lower pressure end, thereby forcing slower moving liquid reactant to the sidewalls of the reactor while urging it at a substantially slower linear speed toward the exit.

Under the described conditions, steam is always present as a separate distinct phase once boiling has started in the reactor. The type of flow pattern formed along the major length of the reactor is called two-phase annular flow with the viscous, molten polymer flowing along the inner surface of the pipe in the form of an annulus, while the evolved steam rushes through the center of the cross section of the pipe toward the outlet at a much greater velocity than the more flow-resistant polymer.

Thus, the present invention is applicable to the general type of polymerization system wherein two-phase annular flow through an elongated tubular reaction zone is employed, and has particular utility with the polymerization of high molecular weight linear condensation polyamides of fiber-formable quality.

In the two-phase annular flow system as described herein, it has been found that unless start-up and shut-down sequences are controlled in a predetermined manner, a hard gel-like formation accumulates along the inner surface of the reactor which gel must be removed through costly cleaning operations. Otherwise, the gel will contaminate produced polymer for a substantial time by being gradually or intermittently sloughed off into the polymer stream which flows along the inner surface of the tube in the form of an annulus in cross section.

In the case of polyamides, as well as other oxidatively degradable polymeric materials polymerized in two-phase annular flow, it has been found that the gel formation within the tubular reaction zone consists principally of oxidatively degraded polymer as compared with heat degraded polymer. Using polyhexamethylene adipamide as an example, degradation caused solely by heat (herein referred to as heat degradation) occurs slowly at temperatures above about 265° C. while oxidative degradation occurs rapidly at temperatures of about 265° C. and often at temperatures of 150° C. and below. Thus, in its broadest sense, the present invention is directed to eliminating oxidative degradation of polymers during start-up and shut-down sequences of two-phase annular flow polymerization systems by providing an inert, substantially oxygen-free, blanket throughout the system during the critical periods of start-up and shut-down. On a practical basis it is desirable to operate within the confines of previously existing equipment and materials. Thus, with polycondensation polymerization of polyamides, it is highly desirable to employ the continuous polymerization system initially present, i.e. means for feeding water, monomer solution, additives, etc. required for the polymerization reaction, the tubular reactor, the polymer melt reservoir and heating means.

Concerning the start-up embodiment of the invention, it should be noted that the procedure disclosed herein is particularly applicable to the start-up of a previously used polymerization system. Regardless of the method of cleaning employed during and after system shut-down, some polymer remains along portions of the inner surface of the tubular reactor, particularly along the latter half of the reactor wherein the polymer becomes increasingly more viscous as it approaches the exit because of the high degree of polymerization reached in that section of the tubular reactor. In addition to preventing oxidative degradation of this polymer residue, the start-up sequence also further cleans the reactor by flushing action. Of course, the start-up procedure can also be advantageously employed in conjunction with bringing an unused unit stream since the chance of forming degraded material during the period of heating the reactor up to polymerization temperatures is markedly reduced thereby.

Exemplifying the start-up procedure of polyhexamethylene diamine polymerization in which the polyamide-forming salt thereof in aqueous medium is pumped under pressure into the inlet of a coiled tube reactor, it has been found that in order to essentially completely avoid polymer residue degradation, particularly by oxidative degradation, water should be continuously pumped through the polymerizer before the polymerizer reaches a temperature of about 100° C., i.e. 75–100° C., and preferably before or simultaneously with the introduction of heat. That is, the preferred start-up procedure is to begin the flow of water into the polymer under ambient or room (i.e. 25° C.) temperature conditions, continue the flow of water (and/or steam when the temperature of the reactor reaches 100° C.) to the tubular reactor while raising the internal temperature thereof to polymerization temperature as quickly as possible and then continuously feeding the polyamide-forming salt solution under pressure into the reactor when it reaches operating temperature.

The start-up procedure outlined herein is in contradistinction to the operating principles of two-phase annular flow elongated tubular reactors as accepted in the art heretofore. It has been known that polyamides, particularly when linear and of high molecular weight, oxidatively degrade at temperatures above 150° C. Therefore, it was believed by those skilled in the art that steam and/or water need not be started into the system before the reactor temperature reached about 150° C., and certainly not before a temperature of about 100° C. is reached. However, in part because of the quality and purity of polyamide produced by the two-phase annular flow continuous polymerization method, it has been found that enough oxidatively degraded polymer is produced at temperatures below 150° C. and even at 100° C., to present technical and economic problems in lowering the quality of subsequently polymerized polymer. In other words, the polymer produced by the two-phase, annular flow process is of such a high purity that even traces of degraded material, i.e. quantities which would not pose problems with lower quality polymer such as that produced by many conventional batch operations, are readily apparent in the product and should be avoided.

Following the start-up procedure as disclosed herein, the continuous polymerization system is operated in accordance with the principles stated herein until the system must be shut down. At that time, by utilizing the shut-down procedure as disclosed herein, polymer degradation, particularly oxidative degradation, is negligible. Similar to the situation encountered during system start-up, it had previously been thought that when the reactor reached a temperature below about 150° C., all feed systems could be stopped (in practice water and/or chain-stopper/water mixture and the like are usually being pumped through the reactor during the cooling down period) and the reactor could cool down to ambient or room temperature without the further use of cooling means.

In order to avoid polymer degradation during the shut-down period, it has been found that an oxygen-free inert atmosphere, for example water in the case of nylon polymerization, should be maintained through the elongated tubular reactor until the temperature thereof is below about 50° C. Although this feature forms one of the basic departures in this area, it is hereinafter discussed in conjunction with an integrated shut-down procedure.

Where continuous two-phase annular polycondensation polymerization systems for producing polyamides are employed, it is desirable to initially flush out as much as possible of the high viscosity polymer in the reactor when the system is to be shut-down. This is conveniently accomplished by first pumping a reactant salt solution/chain stopper mixture into the tubular reactor in order to produce a low viscosity polymer (low relative viscosity, i.e. 5 to 10 relative viscosity as measured on an 8.4% solution of the polyamide in 90% formic acid) which prevents further polymerization of monomer and/or molecular weight polymer still in the reactor into high molecular weight polymer and dilutes the highly viscous polymer in the reactor with lower viscosity material, thereby forming a more fluid mixture which can more readily flow out of the reactor. This first step is carried out for at least 1 hour under normal operating temperature and pressure conditions, preferably about 1½ hours. A longer time may be employed, i.e. up to about 24 hours, but no significant improveemnts are noted.

Following the cessation of charging chain stopper/monomer aqueous solution to the reactor through the inlet thereof, a chain stopper/water mixture is pumped through the reactor to retard any further polymerization which may be occurring and to flush out as much remaining polymer, including the low relative viscosity polymer, as possible. During this stage of shut-down, which is operated for at least ¼ hour, preferably ½ hour and if desired up to about 12 hours, the mixture, usually a solution, is pumped through the reactor under a pressure about equal to at least the normal reactor operating pressure during continuous polymerization. This pressure is required to assure removal of maximum amounts of polymer from the sections of the reactor immediately in front of the exit thereof where highest viscosity polymer is present along the inner surfaces of the coil. Lastly, the heating means is turned off and water or other oxygen free, inert material, i.e. water/chain stopper solution, is pumped through the tubular reactor until the temperature thereof is below about 50° C. The initial formation of low molecular weight polymer, because of the miscibility of high molecular weight polymers therewith, cleans out the reactor to a greater extent when used with the process herein disclosed as compared to the shut-down process where it is omitted.

In preferred embodiments of the invention, normal reactor operating pressure is used throughout the shut-down procedure and the heating means is not turned off until after the flushing operation with chain stopper/water mixture is completed.

Chain stoppers employed for polyamides are well known in the art. Many mono-functional compounds may be employed, for example monamines such as n-propyl-amine and n-butylamine or monobasic acids such as acetic acid and propionic acid. Preferably a chain stopper which may be employed during the continuous polycondensation polymerization process and which is soluble in water, such as the above-mentioned acetic acid, is used.

Although the invention has been exemplified hereinbefore with nylon 66 salt or hexamethylene diammonium adipate, aqueous solutions of other polyamide forming reactants are equally applicable. As examples thereof, there may be mentioned polymethylene diammonium salts of aliphatic alpha, omega dicarboxylic acids containing about 8 to 24 carbon atoms, such as hexamethylene diammonium sebacate, pentamethylene diammonium sebacate, octamethylene diammonium adipate, decamethylene diammonium adipate, and omega-amino aliphatic carboxylic acids containing about 6 to 12 carbon atoms such as omega-amino caproic acid and omega-amino undecanoic acid, the corresponding lactams where appropriate, and the condensate of bis(para-amino cyclohexyl) methane with dodecanedioic acid.

In general, the invention is particularly useful with aliphatic and aromatic condensation polyamide having a final relative viscosity of about 25 to 70 and a melting point below about 300° C.

The following examples are intended only to exemplify the invention and not in any manner to limit the scope thereof as defined by the appended claims.

Example 1

The polymerization reactor is a narrow coiled tube, with external heating means, fabricated of steel consisting sequentially from inlet to outlet of 18 meters of internal diameter of 6 millimeters, 18 meters of internal diameter of 9 millimeters, 30 meters of internal diameter of 1.25 centimeters and 22.5 meters of internal diameter of 2.5 centimeters. Water is pumped into the inlet of the tubular reactor and the external jacket heating means is activated. Water is continuously pumped into the coiled tube while the polymerization temperature is raised to 285° C., at which time, the operating pressure is 14 atmospheres. At that time a 47% by weight aqueous solution of hexamethylene diammonium adipate salt containing 0.55% of hexamethylene diamine is pumped under the stated pressure at a rate of 170 grams per minute into the narrow tubular reactor. Following a reaction time of about ½ hour, the polymer emerging from the exit of the coiled tube has a relative viscosity suitable for melt spinning into fibers.

When it becomes necessary to stop production and shutdown the continuous polymerization system, the 47% monomer salt solution and glacial acetic acid are admixed prior to the inlet of the reactor in the proportion of 35:1 and the mixture is fed into the coil at the rate of 175 grams per minute under the operating pressure of 14 atmospheres at the entrance to the tubular reactor. Following 60 minutes of continuous flushing of high viscosity polymer out of the outlet of the reactor into a suitable receptacle, the salt solution is replaced by water and along with the glacial acetic acid is continuously pumped again at the operating pressure of the coil for an additional 60 minutes through the elongated tubular reactor. The heating means is then turned off and water is continuously pumped, also at operating pressure, through the reactor until the temperature thereof reaches 50° C., which takes about an additional four hours. Then the entire system is shut-down for whatever process equipment changes are required. In this manner, the coil is essentially devoid of polymer and the traces which remain are not degraded and will not pose contamination problems when the unit is again started up in accordance with the invention.

When the same process is carried out without beginning the pumping of water into the coil during the start-up sequence before the coil reaches a temperature of about 100–150° C., and/or without pumping the acetic acid solution under adequate pressure and/or without continuing the pumping of water through the coil during the shut-down procedure until the temperature of the coil is below about 50° C., a gel-like oxidatively degraded polymer residue is formed along the inner walls of the tubular reactor.

Example II

Example 1 is repeated utilizing a 47% aqueous solution of omega-amino caproic acid with equally good results.

Various changes obvious to those skilled in the art, such as the use of the invention with other polymers which are polymerized by two-phase annular flow in an elongated tubular reactor, may be made without departing from the spirit and scope of the invention as defined by the appended claims.

What is claimed is:

1. A process for continuously producing a fiber-forming polyhexamethylene adipamide or polyamino caproic acid with decreased polymeric degradation wherein an aqueous reactant solution of hexamethylene diammonium adipate or amino caproic acid is polymerized in the melt at a temperature above about 50° C. at superatmospheric pressure in a reactor while flowing in 2-phase annular flow associated with steam through an elongated tubular reactor, which comprises heating said reactor from ambient temperature to polymerization reaction temperature while maintaining an inert, substantially oxygen-free blanket of water or steam through said reactor; flowing reactant solution into said reactor after polymerization reaction temperature is reached, conducting continuous polymerization in said reactor; shutting down said reactor by stopping the introduction and flow of reactant into said reactor while continuously flowing an inert, substantially oxygen-free water medium through said reactor until the temperature in said reactor is below about 50° C.

2. The process of claim 1 wherein water is fed into said reactor prior to commencing to heat said reactor and the water is continuously fed through the reactor while the temperature of the reactor is raised to the desired polymerization temperature.

3. The process of claim 1 wherein the reactor is shut down by the sequential steps of stopping the flow of reactant into the reactor; flowing a reactant/chain stopper mixture under pressure through the reactor to form low molecular weight polymer to flush high molecular weight out of the reactor; flowing a chain stopper/water mixture through the reactor to flush low molecular weight polymer out of the reactor, cutting heat to said reactor and flowing cooling water through said reactor until the temperature in the reactor is below about 50° C.

4. The process of claim 3 wherein the chain stopper/water mixture is fed into the reactor under pressure.

5. The process of claim 3 wherein the chain stopper is acetic acid.

6. The process of claim 1 wherein hexamethylene diammonium adipate is polymerized.

7. The process of claim 1 wherein omega-amino caproic acid is polymerized.

References Cited
UNITED STATES PATENTS

| | | | |
|---|---|---|---|
| 3,193,535 | 7/1965 | Carter | 260—78 R |
| 3,278,494 | 10/1966 | Lodge | 260—78 R |
| 3,475,387 | 10/1969 | Carter et al. | 260—78 R |
| 3,218,297 | 11/1965 | Sovereign | 260—78 R |
| 3,260,703 | 7/1966 | Coggeshall | 260—78 R |

HAROLD D. ANDERSON, Primary Examiner

U.S. Cl. X.R.

260—78 A, 78 L, 95 C